United States Patent
Bakker et al.

(10) Patent No.: US 9,326,225 B2
(45) Date of Patent: Apr. 26, 2016

(54) METHOD OF PROVIDING COMMUNICATION OVER A MOBILE COMMUNICATION NETWORK

(75) Inventors: Hajo Bakker, Eberdingen (DE); Uwe Doetsch, Freudental (DE); Siegfried Klein, Stuttgart (DE); Andreas Weber, Lehrensteinsfeld (DE)

(73) Assignee: Alcatel Lucent, Boulogne-Billancourt (FR)

( * ) Notice: Subject to any disclaimer, the term of this patent is extended or adjusted under 35 U.S.C. 154(b) by 83 days.

(21) Appl. No.: 14/343,140

(22) PCT Filed: Jul. 26, 2012

(86) PCT No.: PCT/EP2012/064672
§ 371 (c)(1),
(2), (4) Date: Mar. 6, 2014

(87) PCT Pub. No.: WO2013/034363
PCT Pub. Date: Mar. 14, 2013

(65) Prior Publication Data
US 2014/0211688 A1   Jul. 31, 2014

(30) Foreign Application Priority Data
Sep. 6, 2011   (EP) ..................................... 11290397

(51) Int. Cl.
*H04W 80/04*   (2009.01)
*H04W 48/16*   (2009.01)
(Continued)

(52) U.S. Cl.
CPC .............. *H04W 48/16* (2013.01); *H04W 24/02* (2013.01); *H04W 36/0061* (2013.01); *H04W 8/26* (2013.01); *H04W 36/0055* (2013.01); *H04W 36/24* (2013.01); *H04W 84/047* (2013.01); *H04W 88/08* (2013.01)

(58) Field of Classification Search
CPC ...... H04W 72/04; H04W 36/30; H04W 80/04
See application file for complete search history.

(56) References Cited

U.S. PATENT DOCUMENTS

2009/0129291 A1   5/2009   Gupta et al.
2010/0020710 A1   1/2010   Gupta et al.
(Continued)

FOREIGN PATENT DOCUMENTS

WO   WO 2011/023234 A1   3/2011

OTHER PUBLICATIONS

Ericsson, "Neighbour Relations and X2 Self-configuration for Relay Nodes," 3rd Generation Partnership Project (3GPP), 3GPP TSG-RAN WG3 #69, R3-102200, pp. 1-6, XP050453076, Madrid, Spain, Aug. 23-27, 2010.
(Continued)

*Primary Examiner* — Andrew Lee
(74) *Attorney, Agent, or Firm* — Fay Sharpe LLP (57) ABSTRACT

The present invention concerns a method of providing communication over a mobile communication network (1) and components for providing communication over the communication network (1). The network (1) includes two or more fixed nodes (2a, 2b) each operating a fixed radio cell (3a, 3b) for serving one or more user equipments (4) via a first radio interface (5a, 5b). Each of these fixed radio cells (3a, 3b) is identified by a physical cell ID (6a, 6b) selected out of a set of N physical cell IDs. In addition, the network (1) includes one or more mobile relay nodes (7) served by the one or more fixed nodes (2a, 2b) via a second radio interface (8a, 8b). The mobile relay nodes (7) each operate a mobile radio cell (9) for serving one or more user equipments (4) via a third radio interface (10). Each of these mobile radio cells (9) is identified by a physical cell ID (6c) selected out of the set of N physical cell IDs. The method includes the step of dynamically assigning a physical cell ID (6c) of the set of N physical cell IDs to the one or more mobile radio cells (9).

13 Claims, 4 Drawing Sheets

(51) Int. Cl.
  *H04W 24/02* (2009.01)
  *H04W 36/00* (2009.01)
  *H04W 88/08* (2009.01)
  *H04W 8/26* (2009.01)
  *H04W 36/24* (2009.01)
  *H04W 84/04* (2009.01)

(56) References Cited

U.S. PATENT DOCUMENTS

| | | | |
|---|---|---|---|
| 2010/0046433 A1* | 2/2010 | Iwamura et al. | 370/328 |
| 2010/0103845 A1 | 4/2010 | Ulupinar et al. | |
| 2010/0309861 A1* | 12/2010 | Gorokhov et al. | 370/329 |
| 2011/0059744 A1* | 3/2011 | Won et al. | 455/450 |
| 2011/0105184 A1* | 5/2011 | Piirainen et al. | 455/562.1 |
| 2011/0143743 A1* | 6/2011 | Pollakowski et al. | 455/422.1 |
| 2012/0015649 A1* | 1/2012 | Li et al. | 455/434 |
| 2013/0040683 A1* | 2/2013 | Siomina et al. | 455/517 |
| 2014/0003327 A1* | 1/2014 | Seo et al. | 370/315 |
| 2014/0133456 A1* | 5/2014 | Donepudi et al. | 370/331 |
| 2014/0192781 A1* | 7/2014 | Teyeb et al. | 370/331 |

OTHER PUBLICATIONS

International Search Report for PCT/EP2012/064672 dated Aug. 31, 2012.

* cited by examiner

METHOD OF PROVIDING COMMUNICATION OVER A MOBILE COMMUNICATION NETWORK

FIELD OF INVENTION

The present invention relates to the field of communication networks and, more specifically, to a method of providing communication over a communication network comprising two or more fixed nodes and one or more mobile relay nodes.

BACKGROUND

In a mobile communication network, in particular in a Mobile LTE Relay communication network, the air-interface of the network—which is the E-UTRAN part (evolved UMTS Terrestrial Radio Access network) of the LTE network—comprises networks nodes, called eNBs, E-UTRAN NodeBs, operating each a fixed radio cell for serving user equipments, UE, located within the coverage area of the respective radio cell.

For the reasons of coverage extension, the E-UTRAN supports a relaying by mobile relay nodes wirelessly connected to an eNB serving the mobile relay node, the eNB therefore is called Donor eNB, DeNB, via a modified version of the E-UTRAN radio interface which is called Un interface.

For the user equipments served by the mobile radio cell operated by the mobile relay node, the mobile relay node appears as a mobile base station. Therefore the user equipments need to know the physical cell ID assigned to the mobile radio cell operated by the mobile relay node for sending and receiving communication via the mobile relay node over the mobile communication network.

SUMMARY

The objective of the present invention is to improve communication over a mobile communication network.

The objective of the present invention is achieved by a method of providing communication over a mobile communication network comprising two or more fixed nodes each operating a fixed radio cell for serving one or more user equipments via a first radio interface, wherein each of the fixed radio cells is identified by a physical cell ID, selected out of a set of N physical cell IDs, and one or more mobile relay nodes served by the two or more fixed nodes via a second radio interface, the one or more mobile relay nodes each operating a mobile radio cell for serving one or more user equipments via a third radio interface, wherein each of the mobile radio cells is identified by a physical cell ID selected out of the set of N physical cell IDs, the method comprising the step of dynamically assigning a physical cell ID, preferably the physical cell IDs, of the set of N physical cell IDs to the one or more mobile radio cells.

The objective of the present invention is further achieved by one or more fixed nodes and one or more mobile relay nodes.

A fixed node comprises a first communication unit adapted to operate a fixed radio cell for serving one or more user equipments via a first radio interface, the fixed radio cell being identified by a physical cell ID selected out of a set of N physical cell IDs, a second communication unit adapted to serve one or more mobile relay nodes via a second radio interface and a control unit adapted to dynamically assign a physical cell ID of the set of N physical cell IDs to the one or more mobile radio cells.

A mobile relay node comprises a first communication unit adapted to operate a mobile radio cell for serving one or more user equipments via a third radio interface, a second communication unit adapted to communicate via a second radio interface with one or more fixed nodes each operating a fixed radio cell for serving one or more user equipments via a first radio interface, wherein each of the fixed radio cells is identified by a physical cell ID selected out of the set of N physical cell IDs, and a control unit adapted—on assignment of a physical cell ID of the set of N physical cell IDs as new physical cell ID—to switch from an old physical cell ID to a new physical cell ID.

By dynamically assigning a physical cell ID to a mobile relay node, the present invention aims to overcome the problem of the restriction of the number of active mobile relay nodes and of the number of mobile radio cells operated by the mobile relay nodes respectively within a mobile communication network as the result of a limited number of available physical cell IDs. This is, as the total number of physical cell IDs in a mobile communication network is restricted, once all available physical cell IDs are assigned, a new mobile radio cell operated by a mobile relay node can not be assigned with a physical cell ID which would uniquely identify the mobile radio cell operated by said mobile relay node within the mobile communication network. This means said mobile radio cell operated by the mobile relay node can not be active in the mobile communication network or in case one of the already assigned physical cell IDs might be assigned to another fixed radio cell operated by a fixed node or to another mobile radio cell operated by a mobile relay node, there will be a confusion and/or collision situation due to the same physical cell ID assigned to two or even more radio cells, fixed radio cells and/or mobile radio cells, in particular the two cells being direct neighbour cells and in the case that a radio cell has two neighbour cells with identical physical cell IDs. Even if the same physical cell ID would be assigned to cells which are not adjacent to each other, but rather being in a quite distance, the confusion and/or collision situation might be attenuated, but still not solved.

Due to the dynamic assignment of the physical cell IDs, the fixed node can serve a huge number of mobile relay nodes as the fixed node controls the allocation of the physical cell IDs required for mobility of the mobile relay nodes.

Furthermore, full user equipment mobility can be provided both in the direction from the mobile relay node towards the macro cell, i.e. the radio cell of the fixed node, and from the macro cell towards the mobile relay node. The fixed node may be for example a DeNB, the mobile relay node may be a mobile relay within a car and user equipment may be a mobile phone, a tablet computer or any device being able to communicate via mobile communication.

With the solution of the present invention, a handover towards the fixed node, i.e. the user equipment is leaving the mobile relay node, i.e. a car, can be carried out according to the 3GPP specification, i.e. there is no impact on standard user equipments. The same applies for handover towards the mobile relay, when user equipment, i.e. a mobile phone, e.g., is leaving the coverage area of the fixed node, i.e. the DeNB, e.g., and is afterwards served by the mobile relay node, i.e. of the car, e.g.

Further advantages of the present invention are achieved by the embodiments of the invention indicated by the dependent claims.

In a preferred embodiment, the method comprises measuring a signal strength of a serving fixed radio cell and a signal strength of surrounding fixed radio cells by a mobile relay node. If the signal strength of a surrounding fixed radio cell exceeds the signal strength of the serving fixed radio cell, a handover request is sent to the serving fixed node by the mobile relay node and a handover acceptance procedure between the serving fixed node and a target fixed node is executed. The target fixed node is one of the surrounding fixed nodes, and is selected as the target fixed node, because the signal strength of the radio cell operated by this node exceeds the signal strength of the serving fixed radio cell, the target fixed node therefore is selected as the fixed network node to which the handover is requested to be performed so that the target fixed node becomes the "new" serving fixed node after the handover from the "old" currently serving fixed node has been completed. If the handover is accepted, a new physical cell ID of the set of N physical cell IDs is selected and the selected new physical cell ID is assigned to a mobile radio cell operated by the mobile relay node.

In a preferred embodiment, the step of assigning the selected physical cell ID to the mobile radio cell comprises the steps of transmitting the new physical cell ID from the serving fixed node or the target fixed node to the mobile relay node and switching from an old physical cell ID to the new physical cell ID by using the new physical cell ID by the mobile relay node to identify the mobile radio cell operated by said mobile relay node.

In a preferred embodiment, the new physical cell ID of the mobile radio cell operated by the mobile relay node is transmitted from the target fixed node by means of a RRC message, RRC message=radio resource control message, to the mobile relay node via a UEif interface, UEif=user equipment interface, of the second radio interface.

In a preferred embodiment, the new physical cell ID of the mobile radio cell operated by the mobile relay node is transmitted from the target fixed node by means of an X2 message to the mobile relay node via a Un interface of the second radio interface. The Un interface is a modified version of the E-UTRAN radio interface connecting a fixed node with a mobile relay node, whereby X2 messages are used for connecting network nodes in an E-UTRAN communication network.

In a preferred embodiment, the physical cell ID is switched from an old physical cell ID to the new physical cell ID by using the new physical cell ID by the mobile relay node to identify the mobile radio cell operated by said mobile relay node. The user equipment detects that the mobile radio cell identified by the new physical cell ID is the strongest radio cell, then the user equipment sends a handover request to the mobile relay node operating said mobile radio cell identified by the new physical cell ID, and a handover procedure to the mobile radio cell identified by the new physical cell ID is executed.

In a preferred embodiment, the physical cell ID is switched from an old physical cell ID to the new physical cell ID by using the new physical cell ID by the mobile relay node to identify the mobile radio cell operated by said mobile relay node. The user equipment which has been served by the mobile radio cell identified by the old physical cell ID detects that the old physical cell ID is not longer transmitted whereby the user equipment suffers a radio link failure. After detection of the radio link failure a RRC connection re-establishment request, =radio resource control connection re-establishment request, of the user equipment is sent from the user equipment to the mobile relay node. The RRC connection re-establishment request includes the old physical cell ID. After reception of the RRC connection re-establishment request from the user equipment by the mobile relay node a RRC connection re-establishment message, =radio resource control connection re-establishment message, is sent from the mobile relay node operating said the mobile radio cell to the user equipment. In a preferred embodiment, the physical cell ID is switched from an old physical cell ID to the new physical cell ID by using the new physical cell ID by the mobile relay node to identify the mobile radio cell operated by said mobile relay node. Then a RRC connection reconfiguration message, =radio resource control connection reconfiguration message, is sent to all active user equipments served by the mobile radio cell identified by the old physical cell ID. The RRC connection reconfiguration message forces the user equipments to connect to the mobile radio cell identified by the new physical cell ID. This message can be sent out independently of a previous measurement report of user equipment.

In a preferred embodiment, the RRC connection reconfiguration message is sent before the physical cell ID is switched from the old physical cell ID to the new physical cell ID, and a handover timer of the user equipment is triggered based on the reception of said RRC connection reconfiguration message. The user equipment is connected to the mobile radio cell identified by the new physical cell ID as soon as the handover timer expires or as long as the handover timer is still running.

In a preferred embodiment, the physical cell ID is switched at a specific time stamp from an old physical cell ID to the new physical cell ID by using the new physical cell ID by the mobile relay node to identify the mobile radio cell operated by said mobile relay node. A broadcast message comprising the new physical cell ID and the time stamp is transmitted towards the user equipment served by the mobile radio cell identified by the old physical cell ID.

In a preferred embodiment, a fixed node of the two or more fixed nodes provides an internal list, which stores information about a physical cell ID of the set of N physical cell IDs currently assigned to a fixed radio cell operated by the fixed node and information about a physical cell ID of the set of N physical cell IDs currently assigned to a surrounding fixed radio cell operated by a surrounding fixed node and/or information about a physical cell ID of the set of N physical cell IDs currently assigned to a mobile radio cell operated by a mobile relay node, in particular a mobile relay node served by the fixed node. Then one of the physical cell IDs of the set of N physical cell IDs is selected by the fixed node, which according to the internal list is not yet currently assigned. Also a physical cell ID may be selected as new physical cell ID, if said physical cell ID previously assigned to another fixed radio cell or mobile radio cell, is now not used any more and has therefore been released.

In a preferred embodiment, the fixed node receives from a surrounding fixed node information about a physical cell ID of the set of N physical cell IDs currently assigned to a surrounding fixed radio cell operated by the surrounding fixed node and/or information about a physical cell ID of the set of N physical cell IDs currently assigned to a surrounding mobile radio cell operated by a surrounding mobile relay node served by the surrounding fixed node. Then the internal list is updated by means of the received information.

Preferably, said fixed node is the target fixed node or the serving fixed node.

In a preferred embodiment, the mobile relay node stores information about the physical cell IDs of the surrounding fixed and/or mobile radio cells and sends the information to the fixed node, wherein said fixed node may be the serving fixed node or the target fixed node, for update of the internal list by means of the received information.

BRIEF DESCRIPTION OF THE FIGURES

The features and advantages of the present invention will be more completely understood by reference to the following detailed description when taken in conjunction with the accompanying drawings, wherein.

DESCRIPTION OF EMBODIMENTS

Figure 1:
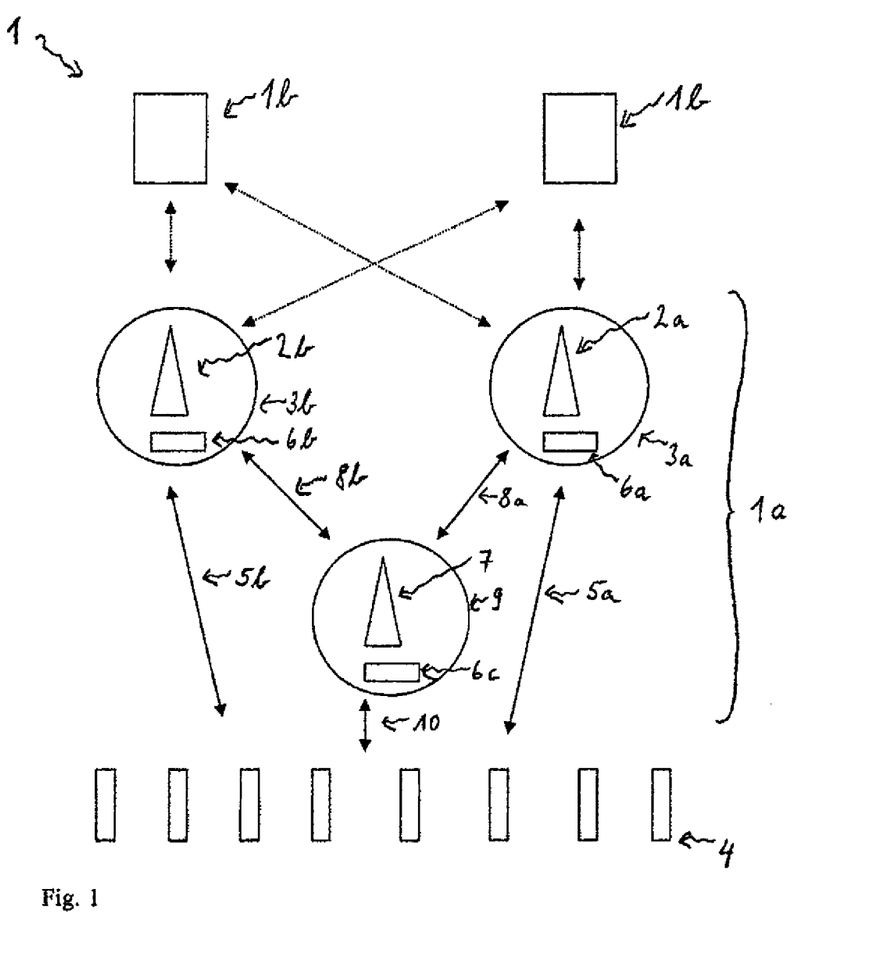
FIG. 1 depicts an overall view of the structure of a mobile communication network.

FIG. 1 shows a mobile communication network 1 comprising the air-interface part 1a of the network and other network nodes 1b which are in particular access nodes of the network. The air-interface part comprises fixed nodes 2a, 2b and one or more mobile relay nodes 7 of which only one is depicted in FIG. 1. Furthermore, FIG. 1 shows user equipments 4 served by the network nodes 2a, 2b and 7. The user equipments 4 may be mobile phones, laptop computers or other devices able to communicate by mobile communication.

In an exemplary embodiment, the mobile communication network 1 is a LTE network of which the air-interface part of the network 1a is implemented with E-UTRAN network components. In case of a LTE network, the fixed nodes 2a, 2b of the E-UTRAN part 1a of the network 1 are E-UTRAN nodeBs, eNBs, wherein an eNB which is serving a mobile relay node 7 is called Donor eNB, DeNB.

In an exemplary embodiment, mobile relay nodes 7 may be a mobile relay within a car, a train or a bus.

In an exemplary embodiment, the network nodes 1b may be mobile management entities, MME, and/or serving gateways, S-GW. A MME is a key control node for the access network, e.g. the LTE access network, and a S-GW is an access gateway.

As shown in FIG. 1, each fixed node 2a, 2b operates a fixed radio cell 3a, 3b for serving one or more user equipments 4 via a first radio interface 5a, 5b and for serving one or more of the mobile relay nodes 7 via a second radio interface 8a, 8b. The mobile relay nodes 7 operate each a mobile radio cell 9 for serving one or more user equipments 4 via a third radio interface 10. In FIG. 1 only one mobile relay node 7 is depicted. To each radio cell, i.e. both to each of the fixed radio cells 3a, 3b and to each of the mobile radio cells 9 a physical cell ID (6a, 6b, 6c ... 6N) is assigned identifying the radio cell operated by the respective node.

In the exemplary embodiment depicted in FIG. 1, the physical cell ID 6a is assigned to the fixed radio cell 3a and identifies the fixed radio cell 3a operated by the fixed node 2a, the physical cell ID 6b is assigned to the fixed radio cell 3b and identifies the fixed radio cell 3b operated by fixed node 2b and the physical cell ID 6c is assigned to the mobile radio cell 9 and identifies the mobile radio cell 9 operated by the mobile relay node 7. Each physical cell ID is selected out of a set of N physical cell IDs (6a, 6b, 6c ... 6N). The number of physical cell IDs available in the mobile communication network is restricted.

In an exemplary embodiment, wherein the mobile communication network is a LTE communication network, the number N of the physical cell IDs is restricted to 504. Therefore, an assignment of a predefined physical cell ID for each mobile radio cell which is persistent for a longer time during the movement of the mobile relay node operating said mobile radio cell is not possible as more mobile radio cells operated by the mobile relay nodes than the available number of physical cell IDs, e.g. for the LTE network 504, should be served which would not be possible, if a physical cell ID was assigned once for ever and could therefore not be re-used after release of the mobile radio cell operated by the mobile relay node. A mobile relay node can be for example a mobile relay within a car, so that the mobile relay node is changing the local position of the mobile radio cell operated by said mobile relay node as the car is changing its local position. In addition, there is a 3GPP requirement that neighbour cells of a source cell should not have the same physical cell ID; otherwise a handover might fail as the wrong target cell might be addressed by the source cell.

The assignment of a physical cell ID out of the set of N physical cell IDs is therefore made dynamically. This means a physical cell ID is not assigned to a mobile radio cell once for ever, but the assignment is made in a way that the N available physical cell IDs are used, released and re-used in a way to achieve the usage of the physical cell IDs in an effective way taken in consideration which physical cell IDs are currently used, i.e. still used or not used anymore so as the respective physical cell IDs can be released and re-used when needed. In addition, a confusion or collision due to same physical cell IDs assigned to radio cells being neighbour cells or adjacent cells should be avoided accordingly.

This method depicts a new concept to re-use physical cell IDs in an advanced manner, i.e. a physical cell ID is assigned out of the set of N, for the exemplary LTE network: N=504, physical cell IDs, dynamically. This dynamic assignment of a physical cell ID is a new task of the fixed node serving the mobile relay node, e.g. in case of the exemplary LTE network, the DeNB serving the mobile relay node, which has not yet been described by 3GPP.

Figure 2:
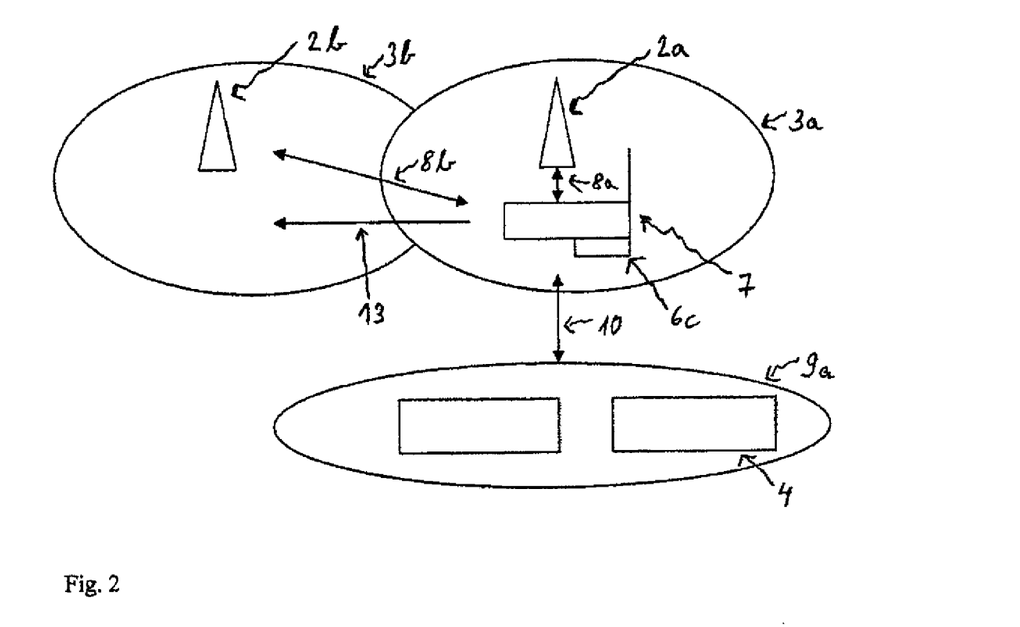
FIG. 2 is a block diagram showing a physical cell ID assignment in a mobile communication network before a handover is provided.
Figure 3:
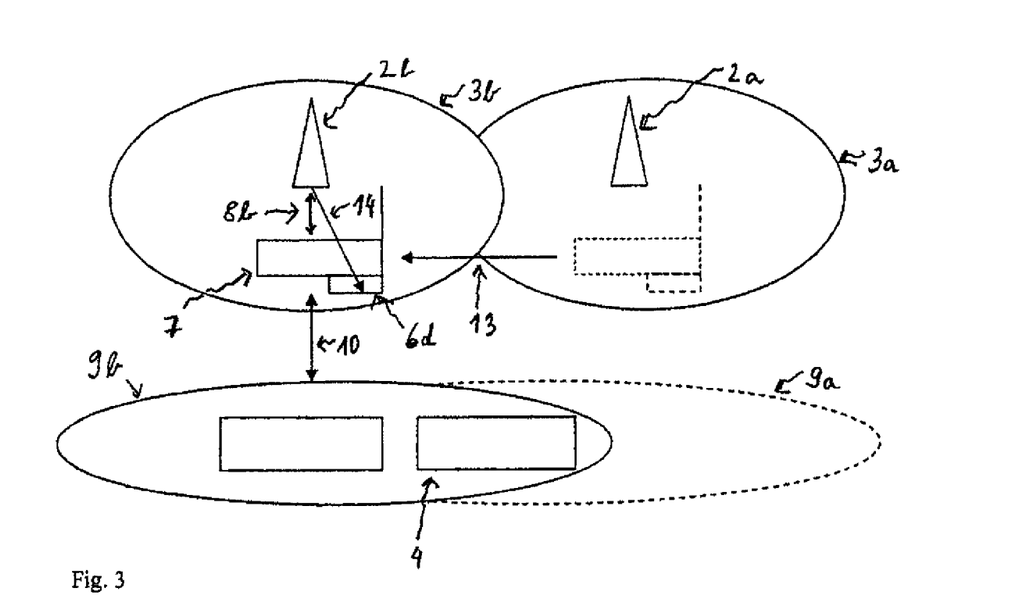
FIG. 3 is a block diagram showing a physical cell ID assignment in a mobile communication network after a handover is provided.
Figure 4:
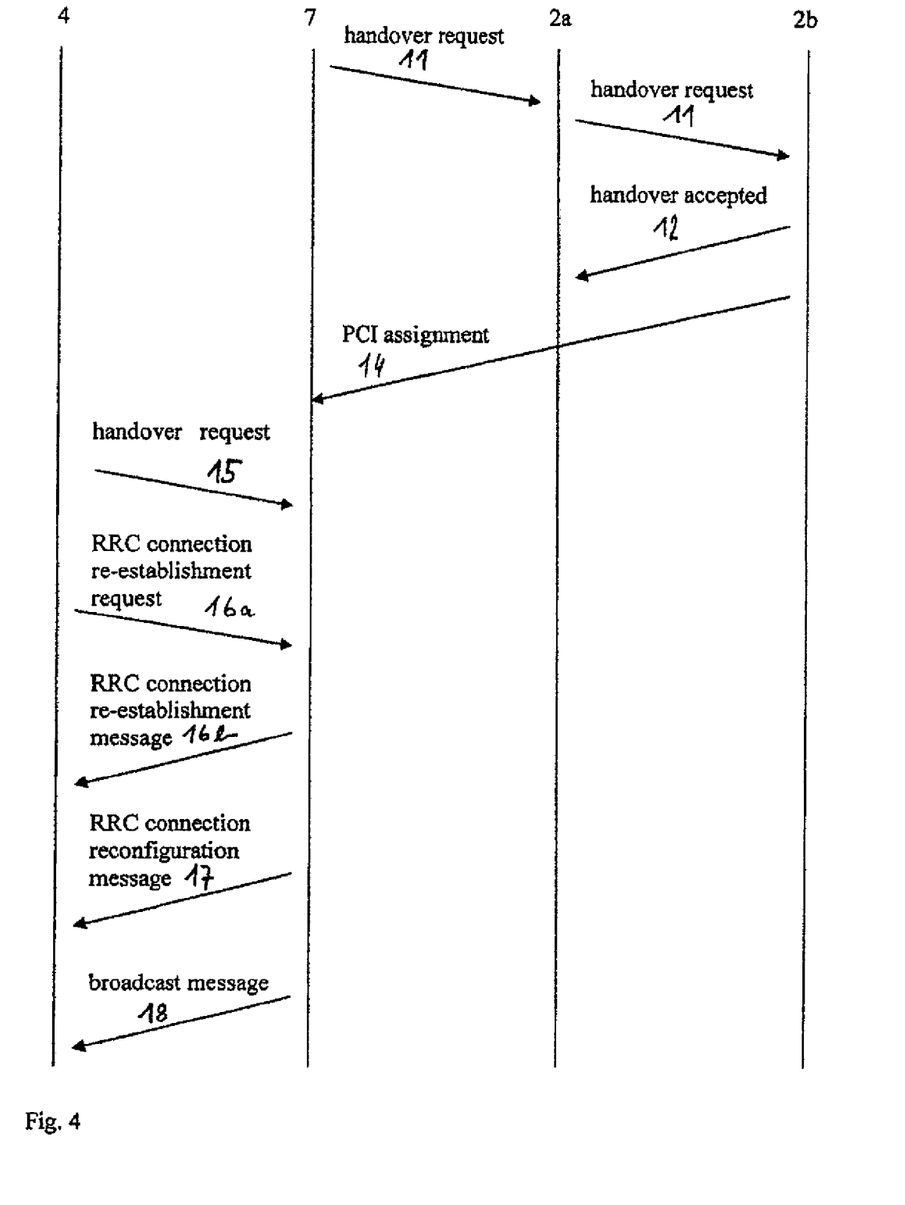
FIG. 4 is a flow diagram showing the communication procedure for physical cell ID assignment and handover within a communication network

The dynamic assignment of the physical cell ID will be more completely understood with reference to FIGS. 2-4, where the same reference signs refer to corresponding components, partly already shown in FIG. 1.

In a preferred embodiment, a mobile relay node 7 (FIG. 2) measures the signal strength of a serving fixed radio cell 3a and the signal strength of surrounding fixed radio cells, for example of the surrounding fixed radio cell 3b. If the signal strength of one of the surrounding fixed radio cells, for example the signal strength of the fixed radio cell 3b, exceeds the signal strength of the fixed radio cell 3a, the mobile relay node 7 sends a handover request 11 (FIG. 4) to the serving fixed node 2a. The serving fixed node 2a executes a handover acceptance procedure 12 (FIG. 4) by sending the handover request 11 to the fixed node 2b operating the fixed radio cell 3b of which the signal strength is measured to be exceeding the signal strength of the serving fixed radio cell 3a. The fixed node 2b is therefore defined as the target fixed node 2b, i.e. the fixed node to which a handover is intended to be performed. If by the target fixed node 2b the handover request is accepted 12 (FIG. 4), the handover 13 (FIGS. 2, 3) is performed from the serving fixed node 2a to the target fixed node 2b by selecting a new physical cell ID 6d (FIG. 3) of the set of N physical cell IDs and assigning 14 (FIGS. 3, 4) the selected physical cell ID 6d to the mobile radio cell 9b operated by the mobile relay node 7, whereby the new physical cell ID 6d replaces the old physical cell ID 6c (FIG. 2, 3).

In a preferred embodiment, the serving fixed node 2a is a DeNB, the target fixed node 2b is also a DeNB of a LTE communication network and the mobile relay node 7 is a mobile relay within a car, a train or a bus, e.g.

FIG. 3 shows the situation after the handover procedure 13 has been effected. After handover 13 of the mobile relay node 7 from the "old" serving fixed node 2a to the "new" fixed node, i.e. the target fixed node 2b, the new physical cell ID 6d is assigned to the mobile radio cell 9b operated by the mobile relay node 7. Before the handover procedure 13, the mobile relay node 7 operated the mobile radio cell 9a (FIG. 2) for serving the user equipments 4. After the handover procedure 13, the mobile relay node 7 operates the mobile radio cell 9b for serving the user equipments 4 (FIG. 3).

In a preferred embodiment, the selected physical cell ID 6d is assigned to the mobile radio cell 9b operated by the mobile relay node 7 by transmitting the new physical cell ID 6d from the "old" serving fixed node 2a or from the "new" target fixed node 2b to the mobile relay node 7 and by switching from an old physical cell ID 6c to the new physical cell ID 6d by using the new physical cell ID 6d by the mobile relay node 7 to identify the mobile radio cell 9b operated by the mobile relay node 7 (FIGS. 3, 4). FIG. 3 shows for exemplary reasons the embodiment of the assignment 14 of the new physical cell ID 6d to the mobile radio cell 9b operated by the mobile relay node 7 by, i.e. from, the target fixed node 2b.

In a preferred embodiment, the target fixed node 2b transmits the new physical cell ID 6d of the mobile radio cell 9b operated by the mobile relay node 7 by means of a RRC message, =radio resource control message, to the mobile relay node 7 via a UEif, UEif=user equipment interface, of the second radio interface 8b (FIG. 3).

In a preferred embodiment, the target fixed node 2b transmits the new physical cell ID 6d of the mobile radio cell 9b operated by the mobile relay node 7 by means of a X2 message to the mobile relay node 7 via a Un interface of the second radio interface 8b (FIG. 3).

In a preferred embodiment, the Un interface is a modified version of the E-UTRAN radio interface of a LTE communication network.

In a preferred embodiment, the mobile relay node 7 switches immediately from an old physical cell ID 6c to the new physical cell ID 6d by using the new physical cell ID 6d to identify the mobile radio cell 9b which is operated by the mobile relay node 7. In this case, the user equipment 4 detects that the mobile radio cell 9b which is identified by the new physical cell ID 6d is the strongest radio cell and sends out a handover request 15 (FIG. 4) to the mobile relay node 7 operating the mobile radio cell 9b identified by the new physical cell ID 6d. In order to achieve that the user equipments 4 can continue to be served by said mobile relay node 7, the new physical cell ID 6d has to be transmitted to the user equipments 4 so that they can connect to the "new" mobile radio cell 9b identified by the new physical cell ID 6d. Therefore following the handover request 15 of the user equipments 4, a handover procedure 13 is executed to the mobile radio cell 9b identified by the new physical cell ID 6d so that the communication from the user equipments 4 via the mobile relay node 7 operating the mobile radio cell 9b and further to and over the communication network 1 can be provided.

In a preferred embodiment, after the mobile relay node 7 has switched from the old physical cell ID 6c to the new physical cell ID 6d by using the new physical cell ID 6d to identify the mobile radio cell 9b operated by said mobile relay node 7, the user equipment 4 detects that the old physical cell ID 6c is not longer transmitted, whereby the user equipment 4 suffers a radio link failure. After the user equipment 4 detects the radio link failure, a RRC connection re-establishment request 16a of the user equipment 4 which has been served by the mobile radio cell 9a identified by the old physical cell ID 6c is sent from said user equipment 4 to the mobile relay node 7 via the third radio interface 10 (FIGS. 3, 4). The RRC connection re-establishment request 16a includes the old physical cell ID 6c. As the mobile relay node 7 still knows the user equipment context, the communication can be resumed, i.e. there will be no call drop. Accordingly, a RRC connection re-establishment message 16b is sent from the mobile relay node 7 to the user equipment 4 via the third radio interface 10 (FIGS. 3, 4).

In a preferred embodiment, after the mobile relay node 7 has switched from the old physical cell ID 6c to the new physical cell ID 6d by using the new physical cell ID 6d to identify the mobile radio cell 9b operated by the mobile relay node 7, the mobile relay node 7 sends a RRC connection reconfiguration message 17 to all active user equipments 4 served by the mobile radio cell 9a identified by the old physical cell ID 6c, i.e. served by the mobile relay node 7 while operating the mobile radio cell 9a identified by the old physical cell ID 6c via the third radio interface 10 (FIGS. 3, 4). The RRC connection reconfiguration message 17 forces the user equipments 4 to connect to the mobile radio cell 9b identified by the new physical cell ID 6d.

In a preferred embodiment, the RRC connection reconfiguration message 17 is sent to the user equipments 4 before the physical cell ID is switched from the old physical cell ID 6c to the new physical cell ID 6d and a handover timer of the user equipment 4 is triggered based on the reception of the RRC connection reconfiguration message 17. The user equipment 4 is connected to the mobile radio cell 9b identified by the new physical cell ID 6d as soon as the handover timer expires or as long as the handover timer is still running.

In a preferred embodiment, the mobile relay node 7 switches at a specific time stamp from the old physical cell ID 6c to the new physical cell ID 6d by using the new physical cell ID 6d to identify the mobile radio cell 9b operated by said mobile relay node 7. In this embodiment, the mobile relay node 7 transmits a broadcast message 18 comprising the new physical cell ID 6d and the time stamp towards the user equipment 4 served by the mobile radio cell 9a identified by the old physical cell ID 6c via the third radio interface 10 (FIGS. 3, 4). At the specific time stamp the physical cell ID changes and the user equipment 4 uses the new physical cell ID 6d instead of the old physical cell ID 6c, in particular for being served by the mobile relay node 7.

In a preferred embodiment, a fixed node 2a of the two or more fixed nodes provides an internal list which stores information about a physical cell ID 6a of the set of N physical cell IDs currently assigned to a fixed radio cell 3a operated by the fixed node 2a and information about a physical cell ID 6b of the set of N physical cell IDs currently assigned to a surrounding fixed radio cell 3b operated by a surrounding fixed node 2b, and/or information about a physical cell ID 6c of the set of N physical cell IDs currently assigned to a mobile radio cell 9 operated by a mobile relay node 7, in particular a mobile relay node 7 served by the fixed node 2a. The fixed node 2a selects a physical cell ID of the set of N physical cell IDs which according to the internal list is not yet currently assigned.

In a preferred embodiment, the fixed node 2a, receives from a surrounding fixed node 2b information about a physical cell ID 6b of the set of N physical cell IDs currently assigned to a surrounding fixed radio cell 3b operated by the surrounding fixed node 2b and/or information about a physical cell ID 6c of the set of N physical cell IDs currently assigned to a surrounding mobile radio cell 9 operated by a surrounding mobile relay node 7 served by the surrounding fixed node 2b, and updates the internal list by means of the received information.

In a preferred embodiment, the mobile relay node 7 stores information about physical cell IDs of the surrounding fixed and/or mobile radio cells and sends said information to the serving fixed node and/or the target fixed node for update of the internal list by means of the received information.

In a preferred embodiment, the serving fixed node will add the selected physical cell ID to its internal list, also the mobile relay node will update its internal list with the physical cell ID of the serving fixed radio cell. A handover request from the mobile relay node towards the radio cell operated by the serving fixed node and vice versa is possible from now on, i.e. the standard handover messages via the X2 interface can be exchanged.

In a preferred embodiment, the serving fixed node will send the complete list of all physical cell IDs related to its fixed neighbours to enable as well a handover towards other fixed neighbours, e.g. the mobile relay node is located at a cell border towards a second radio cell or a radio cell of a second serving fixed node and the received signal is stronger than the signal of the radio cell operated by the serving fixed node.

In a preferred embodiment, the serving fixed node sends the complete list of all physical cell IDs related to mobile radio cells operated by mobile relay nodes to enable as well a handover between the mobile relay nodes. Update of the list, after a handover towards other radio cell, might also be possible.

In a preferred implementation of all embodiments, the mobile communication network is a LTE communication network, the two or more serving fixed nodes are DeNBs and the mobile relay node is a mobile relay within a car, a bus or a train.

The invention claimed is:

1. A method of providing communication over a mobile communication network comprising two or more fixed nodes each operating a fixed radio cell for serving one or more user equipments via a first radio interface, wherein each of the fixed radio cells is identified by a physical cell ID, selected out of a set of N physical cell IDs, and one or more mobile relay nodes served by the two or more fixed nodes via a second radio interface, the one or more mobile relay nodes each operating a mobile radio cell for serving one or more user equipments via a third radio interface, wherein each of the mobile radio cells is identified by a physical cell ID selected out of the set of N physical cell IDs, wherein the method comprises:
dynamically assigning a physical cell ID of the set of N physical cell IDs to the one or more mobile radio cells,
measuring a signal strength of a serving fixed radio cell and a signal strength of surrounding fixed radio cells by a mobile relay node,
if the signal strength of a surrounding fixed radio cell exceeds the signal strength of the serving fixed radio cell, sending a handover request to the serving fixed node by the mobile relay node and executing a handover acceptance procedure between the serving fixed node and a target fixed node, and
if the handover is accepted, then assigning a new physical cell ID of the set of N physical cell IDs to a mobile radio cell operated by the mobile relay node.

2. The method according to claim 1, wherein the method comprises:
providing by a fixed node of the two or more fixed nodes an internal list which stores information about a physical cell ID of the set of N physical cell IDs currently assigned to a fixed radio cell operated by the fixed node, and information about a physical cell ID of the set of N physical cell IDs currently assigned to a surrounding fixed radio cell operated by a surrounding fixed node, and/or information about a physical cell ID of the set of N physical cell IDs currently assigned to a mobile radio cell operated by a mobile relay node, in particular a mobile relay node served by the fixed node, and
wherein dynamically assigning the physical cell ID comprises selecting by the fixed node a physical cell ID of the set of N physical cell IDs which according to the internal list is not yet currently assigned.

3. The method according to claim 2, wherein the method comprises:
receiving by the fixed node from a surrounding fixed node information about a physical cell ID of the set of N physical cell IDs currently assigned to a surrounding fixed radio cell operated by the surrounding fixed node and/or information about a physical cell ID of the set of N physical cell IDs currently assigned to a surrounding mobile radio cell operated by a surrounding mobile relay node served by the surrounding fixed node, and updating the internal list by means of the received information.

4. The method according to claim 2, wherein the method comprises:
storing, by the mobile relay node, information about physical cell IDs of the surrounding fixed and/or mobile radio cells,
sending the information to the fixed node and updating the internal list by means of the received information.

5. The method according to claim 1, wherein the method comprises:
transmitting the new physical cell ID from the serving fixed node or the target fixed node to the mobile relay node and
switching from an old physical cell ID to the new physical cell ID by using the new physical cell ID by the mobile relay node to identify the mobile radio cell operated by said mobile relay node.

6. The method according to claim 5, wherein the new physical cell ID of the mobile radio cell operated by said mobile relay node is transmitted from the target fixed node by means of a RRC message to the mobile relay node via a UE if interface of the second radio interface.

7. The method according to claim 5, wherein the new physical cell ID of the mobile radio cell operated by said mobile relay node is transmitted from the target fixed node by means of a X2 message to the mobile relay node via a Un interface of the second radio interface.

8. The method according to claim 1 comprising:
switching from an old physical cell ID to the new physical cell ID by using the new physical cell ID by the mobile relay node to identify the mobile radio cell operated by said mobile relay node,
detecting by the user equipment that the mobile radio cell identified by the new physical cell ID is the strongest radio cell,
sending by the user equipment a handover request to the mobile relay node operating the mobile radio cell identified by the new physical cell ID and executing a handover procedure to the mobile radio cell identified by the new physical cell ID.

9. The method according to claim 1 comprising:
switching from an old physical cell ID to the new physical cell ID by using the new physical cell ID by the mobile relay node to identify the mobile radio cell operated by said mobile relay node,
detecting by the user equipment that the old physical cell ID is not longer transmitted, whereby the user equipment suffers a radio link failure,
after detection of the radio link failure transmitting a RRC connection re-establishment request by the user equipment to the mobile relay node, and transmitting a RRC connection re-establishment message from the mobile relay node to the user equipment via the third radio interface.

10. The method according to claim 1 comprising:
switching from an old physical cell ID to the new physical cell ID by using the new physical cell ID by the mobile relay node to identify the mobile radio cell operated by said mobile relay node and sending a RRC connection reconfiguration message to all active user equipments served by the mobile radio cell identified by the old physical cell ID, the RRC connection reconfiguration message forcing the user equipments to connect to the mobile radio cell identified by the new physical cell ID.

11. The method according to claim 10, wherein the method comprises:
sending the RRC connection reconfiguration message before switching from the old physical cell ID to the new physical cell ID, triggering a handover timer of the user equipment based on the reception of said RRC connection reconfiguration message and connecting the user equipment to the mobile radio cell identified by the new physical cell ID as soon as the handover timer expires or as long as the handover timer is still running.

12. The method according to claim 1, wherein the method comprises:
switching at a specific time stamp from an old physical cell ID to the new physical cell ID by using the new physical cell ID by the mobile relay node to identify the mobile radio cell operated by said mobile relay node and transmitting a broadcast message comprising the new physical cell ID and the time stamp towards the user equipment served by the mobile radio cell identified by the old physical cell ID.

13. A mobile relay node being provisioned to:
operate a mobile radio cell for serving one or more user equipments via a third radio interface, wherein the mobile radio cell is identified by a physical cell ID selected out of a set of N physical cell IDs, communicate via a second radio interface with one or more fixed nodes each operating a fixed radio cell for serving one or more user equipments via a first radio interface, wherein each of the fixed radio cells is identified by a physical cell ID selected out of the set of N physical cell IDs, on assignment of a physical cell ID of the set of N physical cell IDs as new physical cell ID of the mobile radio cell, switch from an old physical cell ID to the new physical cell ID, measure a signal strength of a serving fixed radio cell and a signal strength of surrounding fixed radio cells, if the signal strength of a surrounding fixed radio cell exceeds the signal strength of the serving fixed radio cell, send a handover request to the serving fixed node such that a handover acceptance procedure is executed between the serving fixed node and a target fixed node, and if the handover is accepted, then a new physical cell ID of the set of N physical cell IDs is assigned to a mobile radio cell operated by the mobile relay node.

* * * * *